United States Patent [19]
Reeve

[11] 3,958,725
[45] May 25, 1976

[54] METERING VALVE FOR LUBRICATION INJECTOR

[75] Inventor: Paul H. Reeve, River Vale, N.J.

[73] Assignee: Auto Research Corporation, Rochelle Park, N.J.

[22] Filed: Oct. 15, 1974

[21] Appl. No.: 514,960

[52] U.S. Cl. .............................. 222/335; 184/7 D
[51] Int. Cl.² ......................................... F16N 23/00
[58] Field of Search ............. 222/335; 184/7 D, 7 E

[56] References Cited
UNITED STATES PATENTS

| | | | |
|---|---|---|---|
| 3,209,956 | 10/1965 | McKenzie | 222/335 X |
| 3,393,841 | 7/1968 | Brehmer | 222/335 |
| 3,664,462 | 5/1972 | Smith | 222/335 X |
| 3,715,013 | 2/1973 | Lyth et al. | 222/335 X |
| 1,935,874 | 11/1923 | Davis | 184/7 E |

Primary Examiner—Robert B. Reeves
Assistant Examiner—Francis J. Bartuska
Attorney, Agent, or Firm—Ostrolenk, Faber, Gerb & Soffen

[57] ABSTRACT

An injector for grease or the like fluid: the injector includes two separate pressure cylinders; a respective piston in each cylinder, and each cylinder being divided into two chambers by its respective piston; an inlet upstream of the upstream piston; an outlet downstream of the downstream piston; and connections between the two chambers of the downstream cylinder and between the upstream and downstream cylinders.

8 Claims, 4 Drawing Figures

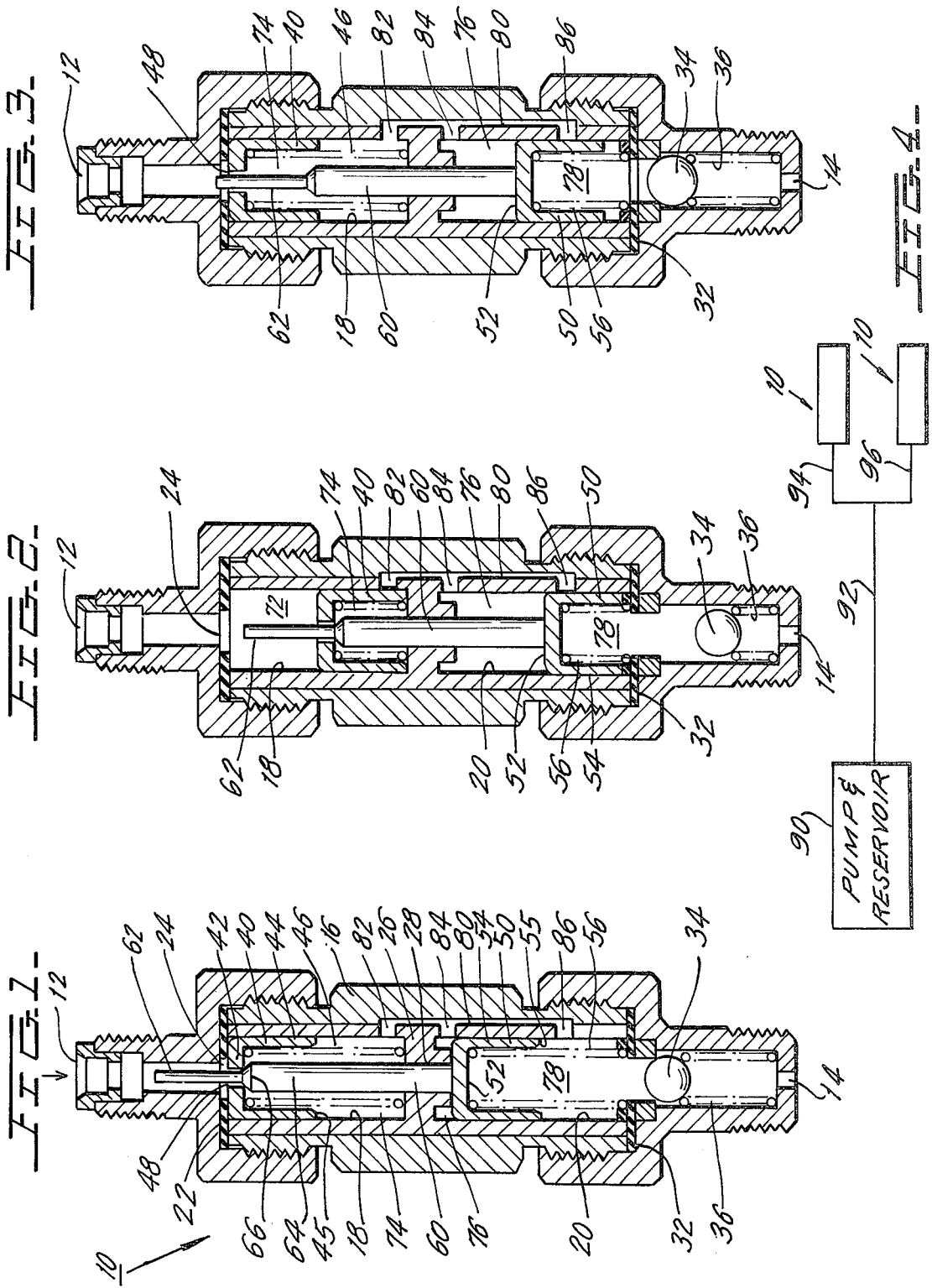

METERING VALVE FOR LUBRICATION INJECTOR

BACKGROUND OF THE INVENTION

The present invention relates to an injector for use in a system for dispensing a fluid, particularly a fluid lubricant and more particularly relatively viscous grease.

In grease distribution systems having plural outlets, there is a problem of apportioning the total output of the pump and metering the quantity dispensed through each outlet. The invention is directed to solving this problem.

The present invention is an outgrowth of co-pending application Ser. No. 175,202, filed Aug. 26, 1971, now abandoned, entitled "Grease Distribution System" and assigned to the assignee hereof. That application teaches one embodiment of a pump for pumping grease to outlet fittings. Such a pump may be used to pump grease through the injector of the present invention. The aforesaid application is incorporated herein by reference with respect to that pump. See also, for example, U.S. Pat. No. 1,596,182.

BRIEF DESCRIPTION OF THE INVENTION

The present invention will be particularly described in connection with an injector for a grease distribution system. However, the injector herein described may be used for injecting other liquids and other lubricants. When grease is referred to herein, it is understood that the description applies to other fluids as well, insofar as they are adaptable to being dispensed through the injector in accordance with the invention.

The injector according to the invention comprises two piston containing cylinders. In each cylinder is a respective piston which is sealable therein and movable therethrough. One side of each cylinder is upstream with respect to flow through the injector and the other side is downstream, and each cylinder is divided by its respective piston into an upstream chamber and a downstream chamber. The upstream and downstream pistons are so connected one with the other that they descend downstream together upon pressure being applied to the upstream side of the upstream piston. Both pistons are normally biased to return to the upstream ends of their respective cylinders. The pistons return independently from each other as the pressures in the chambers of the cylinders change due to varying conditions.

There is fluid flow communication between the downstream chamber of the upstream piston and the upstream chamber of the downstream piston and there is fluid flow communication between the upstream chamber of the downstream piston and the downstream chamber of the downstream piston. There is fluid flow communication between the inlet to the injector and the upstream chamber of the upstream piston. There is also fluid flow communication between the outlet from the injector and the downstream chamber of the downstream piston.

A predictable, measured quantity of grease is dispensed by the injector or by each of the injectors in a complete system including a plurality of injectors. This desirable result is achieved by separating the inlet end of the injector from the outlet end of the injector, such that the charge of grease that enters the inlet end of the injector during one pumping cycle is not the same charge of grease that is injected from the outlet end of the injector during the same pumping cycle. The measured quantity of grease dispensed by an individual injector during each pumping cycle is only that grease that is in the chamber on the downstream side of the downstream piston.

A fuller understanding of the precise structure and operation of a preferred embodiment of the injector just described is obtained from the detailed description of the drawings below.

Accordingly, it is the primary object of the present invention to dispense a predictable, measured quantity of grease from an injector.

It is another object of the invention to dispense such predictable, measured quantity of grease even though the means that initially supplied the grease continues to pressurize the system.

It is a further object of the invention to provide such an injector which is adaptable for use in a grease dispensing system having a plurality of injectors therein.

It is yet another object of the present invention to provide such an injector with a minimum of parts.

These and other objects of the invention will become apparent from the following description of the accompanying drawings.

BRIEF DESCRIPTION OF THE DRAWINGS

FIG. 1 is an elevation view in cross-section of the injector in accordance with the invention before the system in which the injector is located is pressurized and before grease is dispensed from the injector.

FIG. 2 is the same type of view as FIG. 1 showing the same injector in the condition when the system and the injector are both fully pressurized and a measured quantity of grease has just been dispensed from the injector.

FIG. 3 is the same type of view as FIGS. 1 and 2 showing the injector shortly after the system has ceased being pressurized and with the elements of the injector returning to the stable condition of FIG. 1.

FIG. 4 is a schematic representation of a typical grease distribution system incorporating an injector in accordance with the invention.

DETAILED DESCRIPTION OF A PREFERRED EMBODIMENT OF THE INVENTION

Turning to FIG. 1, injector 10 is useful particularly for dispensing grease but may also be used for the dispensing and injecting of other fluids including lubricants.

Injector 10 has an inlet 12, and outlet 14 and a housing 10 therebetween which has within it an upstream cylinder 18 and a downstream cylinder 20. Upstream cylinder 18 is closed at its upper end by resilient closing plate 22, which has an enlarged inlet opening 24 therethrough. Upstream cylinder 18 is sealed at its downstream end by housing dividing section 26, which separates cylinders 18, 20 and also seals the upstream end of cylinder 20. Dividing section 26 is provided with a bore 28 therethrough through which below described actuator rod 60 sealingly, but slidingly passes. Downstream cylinder 20 is closed at the downstream end by sealing plate 32 and by normally closed ball check valve 34 which is biased closed by return spring 36.

Within upstream cylinder 18 is located the upstream piston 40. It is a hollow piston having an operative piston surface 42 that extends across the cylinder and serves a cylinder sealing function. Piston 40 has a depending sleeve section 44 with a lower peripheral edge 45. Return spring 46 normally biases piston 40 upwardly to the illustrated position in FIG. 1 where piston surface 42 abuts sealing ring 22.

Piston surface 42 has an annular opening therethrough which is of a size to be sealed closed by the below described connecting shoulder 66 of below described actuator rod 60.

Situated in downstream cylinder 20 is downstream piston 50. It has an operative piston surface 52 that extends across and seals cylinder 20. Piston 50 has a depending sleeve section 54 which serves a below described sealing function and a further below described injected grease quantity metering function. Sleeve 54 has a lower peripheral edge 55. Return spring 56 normally biases piston 50 upwardly in FIG. 1 to the illustrated position where the piston surface 52 abuts housing dividing section 26. For reasons discussed below, spring 56 is weaker than spring 46.

Actuator rod 60 is fixedly attached to operative surface 52 of piston 50 and rod 60 passes through the larger annular opening 48 in operative surface 42 of piston 40. Actuator rod 60 includes thinner width upstream end portion 62, wider downstream portion 64 and tapered shoulder 66 in between. It is against shoulder 66 that piston surface 42 presses when piston 40 descends due to the pressure in inlet 12. The descent of piston 40 is transmitted to piston 50 by rod 60 causing the latter piston to simultaneously descend (Note FIG. 2). However, as shown in FIG. 3, there is no positive connection between the pistons for causing simultaneous motion in the upstream direction so that piston 40 is able to return separately from piston 50.

Turning to FIG. 2, pistons 40 and 50 divide their respective cylinders 18, 20 into respective upstream and downstream chambers. Piston 40 divides upstream cylinder 18 into upstream chamber 72 and downstream chamber 74. Piston 50 divides downstream cylinder 20 into upstream chamber 76 and downwstream chamber 78.

Returning to FIG. 1, housing 16 includes an interchamber communication bore or conduit 80. By means of conduit 80, there is fluid flow communication among outlet 82 from the upstream cylinder downstream chamber 74, inlet-outlet conduit 84 of the downstream cylinder upstream chamber 76 and inlet 86 to downstream piston downstream chamber 78, whereby conduit 80 joins all of these elements. In connection with the present invention, the operative, significant communication is on the one hand between upstream cylinder downstream chamber 74 and downstream cylinder upstream chamber 76 and on the other hand between downstream cylinder upstream chamber 76 and downstream cylinder downstream chamber 78. It is for convenience in manufacture that a single conduit 80 is provided for both of the communications.

Turning to FIG. 4, an injector such as injector 10 can be positioned in a conventional grease distribution system of the type schematically shown in FIG. 4. This system includes the pump and reservoir assembly 90, main conduit 92 from the pump and reservoir and branch conduits 94, 96 leading to respective individual injectors 10.

Operation of injector 10 is now described: Upon operation of pump 90, conduits 92, 94, 96 are pressurized. Turning to FIG. 1, this pressurizes inlet 12. Through passage 24, pressure is applied to the upstream side of upstream piston operative surface 42. Some grease might normally pass through narrowed passage 48 into upstream cylinder downstream chamber 74. However, as described below, that chamber has previously been completely filled with grease and would not accept any more.

The pressure on piston 40 causes it to descend. The descending piston engages shoulder 66 on actuator rod 60. This causes rod 60 to descend, which in turn transmits the descending motion to piston 50. Both of pistons 40, 50 descend together against the forces of their respective return springs 46, 56.

Comparing FIGS. 1 and 2, as piston 50 descends, all grease in chamber 78 downstream of piston 50 is forced past ball check valve 34, which is pressurized open against the force of its own return spring 36, and the grease in chamber 78 exits through outlet 14. The descent of piston 50 might expel grease through outlet 86 into conduit 80. However, descending depending sleeve 54 blocks outlet 86 and prevents such undesired outlet of grease, and before sleeve 54 has descended enough to cover outlet 86, outflow through outlet 86 is prevented because there is no space to which grease exiting through outlet 86 might escape. Sleeve 54 of piston 50 is of a predetermined length so that piston 50 will only descend a measured distance to the position illustrated in FIG. 2 where lower edge 55 of sleeve 54 rests against sealing ring 32. A precisely measured quantity of grease is thereby dispensed, equal to the volume displaced between the position of piston 50 in FIG. 1 and its position in FIG. 2.

Piston 40 simultaneously descends with piston 50. The grease in upstream cylinder downstream chamber 74 is forced out of chamber 74 by piston 40 through outlet 82 into connecting conduit 80 and through inlet 84 into downstream cylinder upstream chamber 76. Piston 40 descends until the lower edge 45 of its sleeve 44 abuts dividing section 26 of housing 16. The lengths of sleeves 44, 54 are selected so that pistons 40, 50 both descend the desired distances, which are selected to dispense substantially the same volume from both cylinders. In the preferred version of the invention, cylinders 18, 20 are of the same volume so that the descent of piston 40 transfers from upstream cylinder downstream chamber 74 the same volume of grease as there is open volume in upstream chamber 76 of downstream cylinder 20. Some allowance is made for the change in diameter in actuator rod 60 along its length.

Turning to FIG. 3 and comparing it with FIG. 2, when the grease pressure through inlet 12 ceases because pump 90 has ceased pumping, return spring 46 forces piston 40 upstream through cylinder 18 back toward inlet 12. Return spring 46 for piston 40 is stronger than return spring 56 for piston 50 so that piston 40 fully returns before the full return of piston 50, as shown in FIG. 3. With the earlier return of piston 40, passage 48 now surrounding thinner section 62 of actuator rod 60 is considerably enlarged. Through the large pathway of annular passage 48, the grease in chamber 72 above piston 40 is displaced into downstream chamber 74 of upstream cylinder 18. The grease that was in chamber 72 does not return through injector inlet 12 because although pump 90 has ceased operating, the system remains filled with viscous grease. The grease in chamber 72 takes the path of least resistance through open passage 48 into chamber 74.

More slowly rising piston 50 forces the grease in the downstream cylinder upstream chamber 76 to exit through outlet 84 into conduit 80. From conduit 80, the grease has two possible exits. Outlet 82 is blocked by grease that has just entered and filled chamber 76. The only place for the grease to move, therefore, is through inlet 86 into downstream cylinder downstream chamber 78.

When both pistons 40, 50 have returned to their upper positions, therefore, the entire injector 10 is filled with grease, particularly the chamber 74 downstream of piston 40 and the chamber 78 downstream of piston 50. The injector has returned to its condition of FIG. 1, ready to pump grease during the next pumping cycle.

As was noted above, the above described injector 10 has application in a system, such as that shown in FIG. 4, wherein a single pump 90 forces grease into the system. The grease that is divided between branch lines 94, 96 is properly apportioned by injectors 10 in accordance with the desired quantity of grease to be dispensed through each injector.

Although the present invention has been described in connection with a preferred embodiment thereof, many variations and modifications will now become apparent to those skilled in the art. It is preferred, therefore, that the present invention be limited not by the specific disclosure herein, but only by the appended claims.

I claim:

1. An injector for grease, or the like fluid comprising:

an inlet, an outlet, an upstream cylinder communicating with said inlet, and a separate downstream cylinder communicating with said outlet; said upstream and said downstream cylinders having respective upstream and downstream ends; said first and second cylinder being generally aligned between said injector inlet and said injector outlet;

an upstream piston in and sealingly movable through said upstream cylinder and dividing that said cylinder into an upstream chamber that communicates with said inlet and a downstream chamber; first biasing means urging said upstream piston to return upstream through said upstream cylinder;

a downstream piston in and sealingly movable through said downstream cylinder and dividing that said cylinder into an upstream chamber and a downstream chamber, the latter of which communicates with said outlet; second biasing means urging said downstream piston to return upstream through said downstream cylinder;

first fluid flow communication means between said upstream cylinder downstream chamber and said downstream cylinder upstream chamber, and second fluid flow communication means between said downstream cylinder upstream and downstream chambers;

said first fluid flow communication means with said upstream cylinder downstream chamber comprises a second outlet near said upstream cylinder downstream end; said first fluid flow communication means with said downstream cylinder upstream chamber comprises a second inlet at said downstream cylinder upstream end; and said first fluid flow communication means further comprises a first conduit joining said second inlet and second outlet;

said second fluid flow communication means with said downstream cylinder downstream chamber comprises a third inlet somewhat upstream of said downstream cylinder downstream end; said second fluid flow communication means with said downstream cylinder upstream chamber comprises a third outlet at said downstream cylinder upstream end; said second fluid flow communication means further comprises a second conduit joining said third inlet and said third outlet;

actuating means joining said upstream and downstream pistons for causing joint motion of said pistons in the downstream direction through their respective said cylinders;

said actuating means comprises an actuator rod that is attached to and movable with said downstream piston and that extends through said upstream piston; an opening through said upstream piston through which said actuator rod passes, which said upstream piston opening is wider than the section of said actuator rod that is passing therethrough thereby to permit grease to pass through that said opening; a shoulder on said actuator rod which said shoulder is positioned downstream of said upstream piston to be engaged by said upstream piston upon downstream motion of said upstream piston, thereby to shift said downstream piston downstream along with downstream motion of said upstream piston.

2. The injector of claim 1, wherein said second inlet and said third outlet are the same element and said first and said second conduits are continuous one with the other.

3. The injector of claim 1, wherein said first biasing means is stronger than said second biasing means causing said upstream piston to return upstream faster than said downstream piston and raising said upstream piston off said shoulder on said actuator rod.

4. The injector of claim 1, wherein said first biasing means is stronger than said second biasing means causing said upstream piston to return upstream faster than said downstream piston returns.

5. An injector for grease, or the like fluid comprising:

an inlet, an outlet, an upstream cylinder communicating with said inlet, and a separate downstream cylinder communicating with said outlet; said upstream and said downstream cylinders having respective upstream and downstream ends; said first and second cylinder being generally aligned between said injector inlet and said injector outlet;

an upstream piston in and sealingly movable through said upstream cylinder and dividing that said cylinder into an upstream chamber that communicates with said inlet and a downstream chamber; first biasing means urging said upstream piston to return upstream through said upstream cylinder;

a downstream piston in and sealingly movable through said downstream cylinder and dividing that said cylinder into an upstream chamber and a downstream chamber, the latter of which communicates with said outlet; second biasing means urging said downstream piston to return upstream through said downstream cylinder;

first fluid flow communication means between said upstream cylinder downstream chamber and said downstream cylinder upstream chamber, and second fluid flow communication means between said downstream cylinder upstream and downstream chambers;

each of said upstream and said downstream pistons being hollow within itself and each comprising an operative surface sealingly extending across its said cylinder and comprising a depending annular sleeve of predetermined length that sealingly engages the walls of its said cylinder and extends downstream in its said cylinder;

the lengths of said piston sleeves being selected so that and the volumes of said cylinders being selected so that upon a complete traversal by each said piston across its said cylinder, the same volume of grease is moved out of its said cylinder by each said piston;

actuating means joining said upstream and downstream pistons for causing joint motion of said pistons in the downstream direction through their respective said cylinders;

said actuating means comprises an actuator that is attached to and movable with said downstream piston and that extends through said upstream piston; an opening through said upstream piston operative surface through which said actuator rod passes, which said upstream piston operative surface opening is wider than the section of said actuator rod that is passing therethrough thereby to permit grease to pass through that said opening; a shoulder on said actuator rod which said shoulder is positioned downstream of said upstream piston operative surface to be engaged by that said operative surface upon downstream motion of said upstream piston, thereby to shift said downstream piston downstream along with downstream motion of said upstream piston.

6. The injector of claim 5, wherein both of said first and said second cylinders, and said injector inlet and said injector outlet are all in a single housing, and said cylinders are axially separated by a dividing section of said housing therebetween, through which said dividing section said actuator rod sealingly but axially movably passes.

7. The injector of claim 6, wherein said first biasing means is stronger than said second biasing means causing said upstream piston to return upstream faster than said downstream piston and raising said upstream piston off said shoulder on said actuator rod.

8. The injector of claim 7, wherein said upstream and said downstream cylinders have respective upstream and downstream ends;

said first fluid flow communication means with said upstream cylinder downstream chamber comprises a second outlet near said upstream cylinder downstream end; said first fluid flow communication means with said downstream cylinder upstream chamber comprises a second inlet at said downstream cylinder upstream end; and said first fluid flow communication means further comprises a first conduit joining said second inlet and second outlet;

said second fluid flow communication means with said downstream cylinder downstream chamber comprises a third inlet somewhat upstream of said downstream cylinder downstream end; said second fluid flow communication means with said downstream cylinder upstream chamber comprises a third outlet at said downstream cylinder upstream end; said second fluid flow communication means further comprises a second conduit joining said third inlet and said third outlet.

* * * * *